(12) United States Patent
Hui

(10) Patent No.: US 6,185,269 B1
(45) Date of Patent: Feb. 6, 2001

(54) LIQUID METAL REACTOR POWER BLOCK

(75) Inventor: Marvin Man-Wai Hui, Cupertino, CA (US)

(73) Assignee: General Electric Company, Schenectady, NY (US)

( * ) Notice: Under 35 U.S.C. 154(b), the term of this patent shall be extended for 0 days.

(21) Appl. No.: 09/149,602

(22) Filed: Sep. 8, 1998

(51) Int. Cl.[7] .............................. G21C 9/00; G21C 9/008
(52) U.S. Cl. ..................... 376/283; 376/284; 376/285; 376/290; 376/293
(58) Field of Search ............................... 376/283, 285, 376/293, 284, 290

(56) References Cited

U.S. PATENT DOCUMENTS

| | | | |
|---|---|---|---|
| 4,761,261 | 8/1988 | Garabedian | 376/404 |
| 4,859,402 | * 8/1989 | Tupper et al. | 376/285 |
| 5,158,741 | * 10/1992 | Boardman et al. | 376/299 |
| 5,223,210 | * 6/1993 | Hunsbedt et al. | 376/290 |
| 5,491,730 | 2/1996 | Kataoka et al. | 376/283 |
| 5,706,320 | * 1/1998 | Boardman et al. | 376/283 |

* cited by examiner

Primary Examiner—Charles T. Jordan
Assistant Examiner—Kyongtaek K Mun
(74) Attorney, Agent, or Firm—Armstrong Teasdale LLP

(57) ABSTRACT

A seismically isolated liquid metal reactor power block is described. In one embodiment, the liquid metal reactor power block is a substantially rectangular nuclear plant with two nuclear islands and a common liquid metal service facility commonly supported on a seismic isolation platform near grade level. The seismic isolation platform supports the nuclear islands in a mirror-symmetric arrangement on opposite sides of a shared liquid metal service facility. A containment pressure suppression system connects the primary pressure relief volumes of the containment structures of each nuclear island to that of the other and also to a common pressure relief volume in the liquid metal service facility, thereby reducing the pressure load on each individual containment structure.

16 Claims, 3 Drawing Sheets

LIQUID METAL REACTOR POWER BLOCK

FIELD OF THE INVENTION

This invention relates generally to nuclear energy power plants and in particular, to a liquid metal reactor power block.

BACKGROUND OF THE INVENTION

Over the past several years, liquid metal nuclear reactors for commercial production of nuclear power have been under development. Typically, economies of scale drive new nuclear plant configuration toward large, standalone structures. Commercialization of new reactor technology such as liquid metal reactors usually depends on a stepwise demonstration of isolated plant systems at a reduced scale, followed by scale-up to a fully-integrated, large-scale commercial plant. However, stepwise demonstration and testing of plant systems is a costly and time-consuming process. It would be desirable to provide a liquid metal reactor plant configuration of reduced scale which would reduce the cost, risk and time required for full scale testing and demonstration of fully-integrated liquid metal reactors. It would also be desirable to provide a modular liquid metal reactor plant configuration to facilitate liquid metal reactor plant scale-up.

Known modular liquid metal reactor plant configurations exist, but are limited in that they do not provide for seismic isolation of the whole reactor power block and the supporting liquid metal facilities. In one such configuration the refueling process requires the nuclear reactors to be located in underground silos so that seismic isolation is achieved only for the reactors, and only then for the reactors as individual units. Further, seismic isolation is achieved with the use of complicated pipe systems for the liquid metal and process gases, and with isolation gaps around individual reactor modules. In such known plant configurations, a seismic disturbance may still be communicated substantially through the reactor systems, multiplying the damaging effects with potentially disastrous results. The utilization of underground reactor silos, isolation gaps and complicated pipe systems also substantially increases the size, complexity and costs of the reactor plants. It would be desirable to provide a simple and compact modular liquid metal reactor plant configuration with improved seismic isolation. It would be further desirable to provide such a configuration as a substantially above ground structure.

In addition, known modular plant configurations are limited by the requirement that containment structures be able to bear high containment pressure loads. The metal domes used for containment in known modular plant configurations are costly, complicated, and interfere with access for reactor maintenance. It would be desirable to provide a modular liquid metal reactor plant configuration which reduces the requirements and cost of the containment structure by reducing the containment pressure load. It would be further desirable to provide such a reactor plant configuration with access space for maintenance, repair and replacement of reactor components.

SUMMARY OF THE INVENTION

These and other objects may be attained by a seismically isolated, liquid metal reactor power block. In one embodiment, the power block includes two nuclear islands supported on a common seismic isolation platform. The nuclear islands are symmetrically arranged on opposite sides of a common liquid metal service facility servicing both nuclear islands. Each nuclear island includes a containment structure which encloses a volume of atmosphere over the reactor representing an internal pressure relief volume. A containment pressure relief system connects the pressure relief volume of each containment structure with a common containment volume in the liquid metal service facility to reduce the pressure load on each individual containment structure. The power block building structure is located substantially above grade level.

The liquid metal reactor power block described herein provides a compact, reduced cost plant configuration. The modular configuration provides for simple scale-up of plant power output by addition of power blocks, thereby facilitating commercialization of liquid metal reactor technology. The symmetric arrangement of the nuclear islands and full integration of the liquid metal service facility within the power block is a simple and compact arrangement with associated reductions in cost compared to known plant configurations. Elimination of a containment dome provides needed access space for repair and maintenance of reactor systems and also facilitates refueling. The integration of the pressure relief volumes of the two containment structures and the common volume in the liquid metal service facility reduces peak containment pressure, thereby alleviating containment structure requirements and cost. In addition, seismic isolation of the liquid metal reactor power block is more effective than in known plant configurations, and is attained with a simpler, less costly configuration.

DETAILED DESCRIPTION

Figure 1:
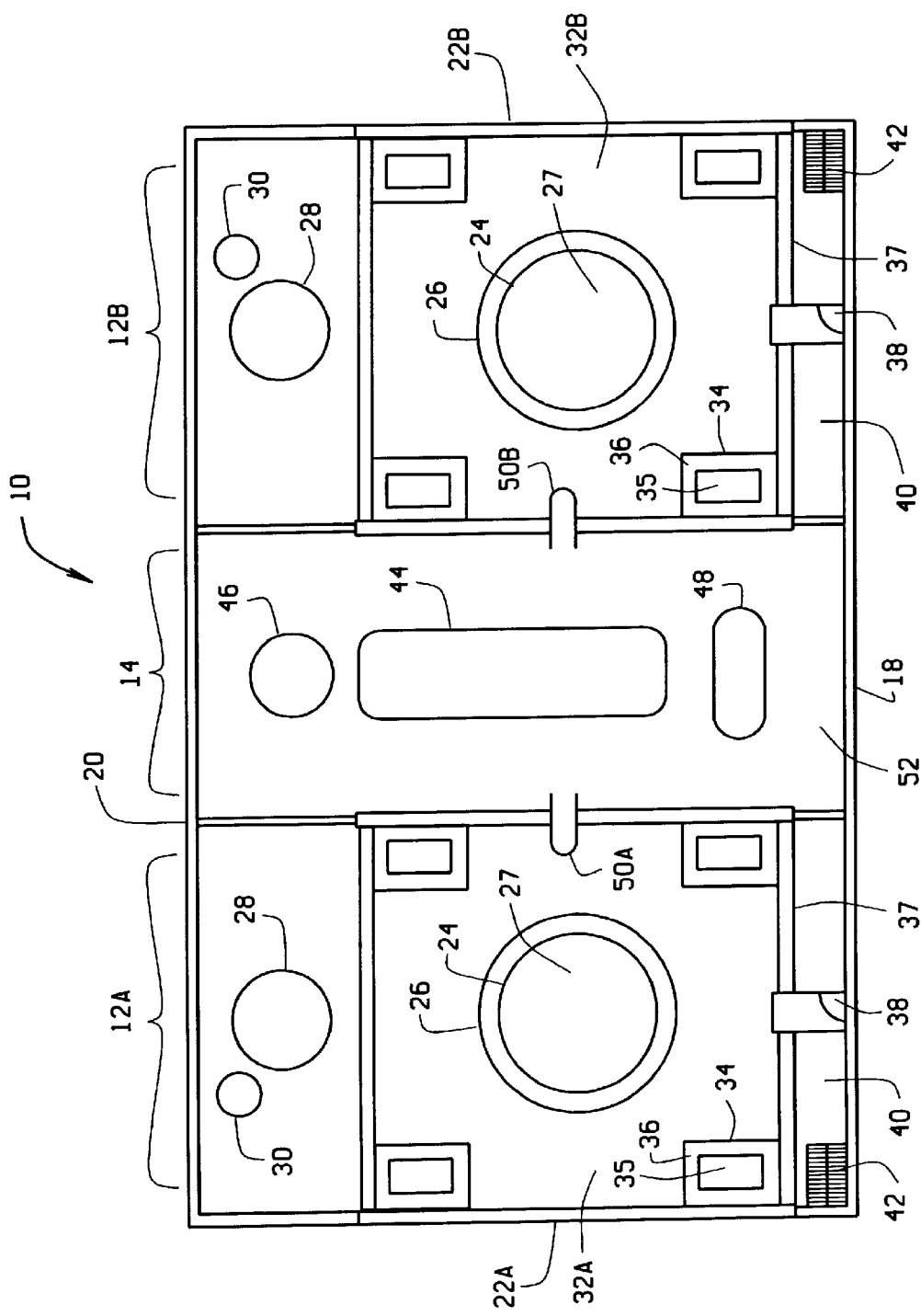
FIG. 1 is a top plan view of a liquid metal reactor power block.

FIG. 1 is a top, plan view of a liquid metal reactor power block 10. In one embodiment, power block 10 is a substantially rectangular nuclear plant generally including two mirror symmetric nuclear islands 12A and 12B, and a common liquid metal service facility 14 all supported by a seismic isolation platform 16 (shown in FIG. 2). Nuclear islands 12A and 12B are substantially alike in structure and are supported by platform 16 on opposite sides of liquid metal service facility 14. Four retaining walls, including a front retaining wall 18, a rear retaining wall 20, and two side retaining walls 22A and 22B enclose nuclear islands 12A and 12B and liquid metal service facility 14. Platform 16 and walls 18, 20, 22A and 22B are fabricated substantially from concrete or the like.

Each nuclear island 12A and 12B generally includes a containment structure, and a nuclear steam supply system (not shown). The nuclear steam supply system includes a reactor system (not shown) enclosed within a reactor vessel 24. Reactor vessel 24 is enclosed by a containment vessel 26 and a closure head 27. In one embodiment, the reactor system is a pool-type liquid metal reactor system using liquid sodium as a primary coolant and generally includes a reactor core, circulating pumps and intermediate heat exchangers (not shown). The nuclear steam supply system further generally includes an intermediate heat transport system (not shown) connected to a steam generator 28, a reaction products separator tank 30, and steam piping and valves (not shown).

The containment structure on each nuclear island 12A and 12B includes an upper chamber, 32A and 32B respectively. Upper chambers 32A and 32B are generally rectangular structures and each include retaining walls, a ceiling and a floor 33 (shown in FIG. 2). Containment vessel 26 extends below floor 33 and through an opening in platform 16. Each chamber 32A and 32B encloses a volume of atmosphere above reactor vessel 24, representing a primary pressure relief volume. One of four stacks 34 occupies each corner of upper chamber 32A. Each stack 34 includes a center duct 35 and an outer duct 36. Upper chambers 32A and 32B and stacks 34 are fabricated substantially from concrete, and upper chambers 32A and 32B are lined with steel.

Each chamber 32A and 32B has a front wall 37 with an opening enclosed by an air lock 38. An outer passageway 40 extends along the outside of each chamber 32A and 32B, along front wall 37. Air lock 38 forms a passage between each upper chamber 32A and 32B and each outer passageway 40. A second air lock 39 encloses an opening through floor 33. A stairway 42 at one end of passageway 40 leads from passageway 40 to grade level.

Liquid metal service facility 14 has a primary liquid metal drain tank 44, an auxiliary water vessel 46, and a primary liquid metal auxiliary cooling system 48. In one embodiment, cooling system 48 includes a NaK loop with a sodium to NaK heat exchanger, and a dump heat exchanger (not shown). A first rupture disc 50A connects the primary pressure relief volume of chamber 32A with a common pressure relief volume enclosed in a primary sodium storage vault 52. Similarly, a second rupture disc 50B connects the primary pressure relief volume of chamber 32B with the common pressure relief volume in primary vault 52.

Figure 2:
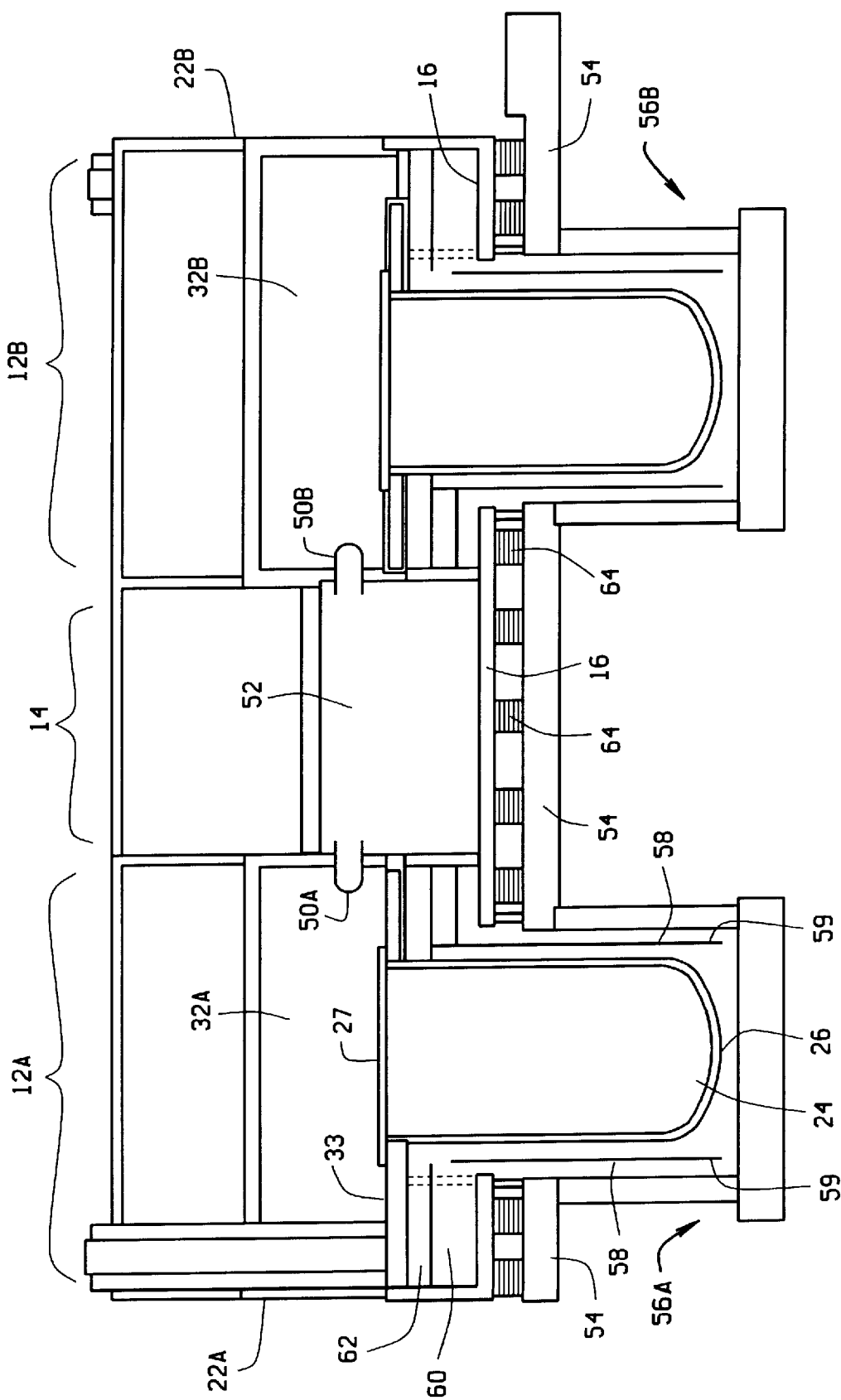
FIG. 2 is a front sectional view of the liquid metal reactor power block.

FIG. 2 is a front sectional view of power block 10. Power block 10 has a foundation including a floor 54 joined to well portions 56A and 56B. Floor 54 and well portions 56A and 56B are fabricated from concrete or other like material. Floor 54 is constructed just below grade level while well portions 56A and 56B extend below grade level. In one embodiment, floor 54 is constructed at about six feet below grade level. Well portions 56A and 56B each surround containment vessel 26, and a collector cylinder 58 with a lower edge 59, for a Reactor Vessel Auxiliary Cooling System. A plenum with a lower level 60 and an upper level 62 is coupled to a stack 34. The plenum is supported on seismic platform 16 and is positioned to direct an air flow around collector cylinder 58.

Floor 54 supports seismic isolation platform 16 on multiple isolation bearings 64. Bearings 64 are fabricated from multiple layers of a thin elastomeric material, and steel shim plates which are vulcanized together to form a composite structure, and are configured to support platform 16 at about grade level. Bearings 64 are characterized by low fundamental frequencies of approximately 0.70 Hz along a horizontal plane, and more than approximately 20 Hz along a vertical plane.

Figure 3:
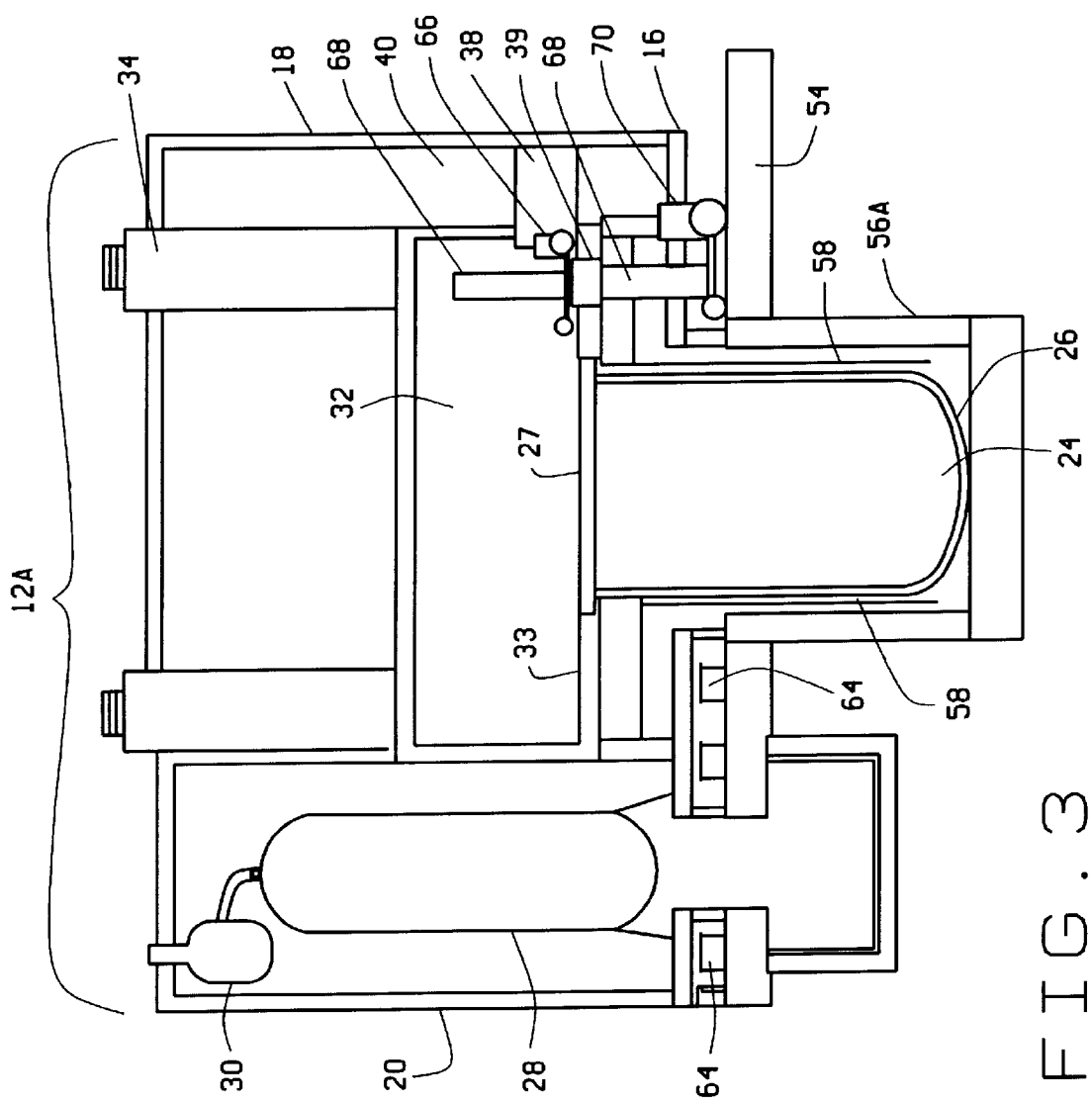
FIG. 3 is a side sectional view of the liquid metal reactor power block.

FIG. 3 is a side sectional view of power block 10 showing nuclear island 12A. An ex-vessel transfer machine 66 is a mobile device provided within chamber 32 for transferring fuel assemblies (not shown) contained within a fuel transfer cask 68. Access to transfer machine 66 is provided through air lock 39. A fuel transfer cask transporter 70 is another mobile device provided near grade level for transferring fuel transfer casks 68.

In use and in one embodiment of the liquid metal reactor power block, an individual power block 10 is installed at a site according to methods known in the art. To generate steam, nuclear heat is transferred through the intermediate heat exchangers to liquid sodium which is circulated by the circulating pumps to steam generator 28 and back to the intermediate heat exchangers. In the event of a sodium leak in steam generator 28 and resultant sodium water reaction incident in one nuclear island, for example 12A, separator tank 30 relieves pressure in steam generator 28 by separating liquid sodium from gaseous reaction products and venting the gaseous reaction products to the atmosphere.

In the event of a substantial sodium spill in one nuclear island, for example 12A, a build-up of hot gaseous reaction products pressurizes upper chamber 32A to more than about 3 to about 4 psig, rupture disc 50A fails, and a mixture of air and hot gaseous reactions products passes through disc 50A into chamber 52. Similarly, if continued build-up of pressure in chamber 52 causes the pressure in chamber 52 to reach about 3 to about 4 psig, then rupture disc 50B fails and the mixture of air and hot gaseous reaction products passes through disc 50B into upper chamber 32B. As a result, the peak containment pressure of a single upper chamber is about 3 psig to about 4 psig, which represents a reduction of more than 50% compared to peak containment pressures in known modular plant configurations. This significantly alleviates the containment requirements and reduces plant cost.

For maintenance of steam generator 28 or the intermediate heat transport system, liquid sodium in the intermediate heat transport system can be drained into drain tank 44. Upper chambers 32A and 32B are accessible through air lock 38 and provide access to the reactor systems for maintenance, repair and replacement of reactor system components. Cooling system 48 provides an auxiliary cooling system for use during reactor maintenance. In use, the heat exchangers of cooling system 48 remove heat from the liquid sodium and vent the heat to the atmosphere.

Collector cylinder 58 operates as part of the Reactor Vessel Auxiliary Cooling System which is a decay heat removal system for removing excess heat from the outer surface of containment vessel 26. In use, cool air flows down outer duct 36 of stack 34, and into plenum lower level 60. Plenum lower level 60 directs air flow horizontally towards the outer surface of collector cylinder 58. Air flow is then directed downward between the inner surface of well portion 56A toward the bottom of well portion 56A. Near the bottom of well portion 56A, at cylinder bottom edge 59, the direction of air flow is reversed and cool air is directed upwards through a space between cylinder 58 and the outer surface of containment vessel 26. Hot air, produced by the transfer of heat from the outer surface of vessel 26, then continues through plenum upper level 62 which directs the air flow to center duct 35 of stack 34. Hot air is then exhausted to the atmosphere through center duct 35.

For refueling operations, the access space provided by chambers 32A and 32B facilitates access to the reactor systems and exchange of fuel assemblies from fuel transfer casks 68. Ex-vessel transfer machine 66 transfers fuel assemblies contained in fuel transfer casks 68. More specifically, transfer machine 66 is used to retrieve spent fuel assemblies from the reactor system and exchange them for fresh fuel assemblies delivered through air lock 39. Fuel transfer cask transporter 70 exchanges spent and fresh fuel assemblies between power block 10 and a central fuel service facility (not shown).

In alternative embodiments of power block 10, reactor systems using liquid metals other than liquid sodium as the primary coolant may be substituted. For example, the reactor system may instead use liquid lead/bismuth or molten salt.

The exact structure, number and arrangement of nuclear islands 12A and 12B and liquid metal service facility 14 on seismic isolation platform 16 may be varied, limited only by the requirement that the islands are positioned substantially symmetrically relative to liquid metal service facility 14. In another alternative embodiment, power block 10 includes one nuclear island positioned adjacent to liquid metal service facility 14 on platform 16.

In an alternative embodiment, power block 10 includes one reactor system with a liquid metal support facility, cooling system and pressure suppression system, which is readily installed at a site. Power block 10 is then ready for testing and demonstration of a fully integrated liquid metal reactor system on a reduced scale. Development of systems takes place on a reduced scale thereby reducing time and cost of development. A full-scale commercial plant with an increased power rating may then be built by installing additional power blocks 10 at the site instead of scaling up an entire plant.

Seismic isolation of all equipment, including the nuclear steam supply systems and the liquid metal service facilities, on common seismic isolation platform 16 reduces seismic risk. Because all systems are supported together on single seismic isolation platform 16, no differential seismic displacement exists between the reactor systems and the liquid metal service facility. This configuration eliminates the need for complex seismic isolation devices, such as complicated sodium piping systems and seismic isolation gaps, among the nuclear islands and liquid metal service facility 14. This affords a simpler, more compact and less costly configuration compared to known modular plant configurations. Further, the structural requirements and cost of the upper containment chambers of the two reactors are reduced while still providing ample access space for reactor repair and maintenance. In addition, equipment costs are reduced by sharing liquid metal service equipment among multiple reactor systems, and the substantially above grade configuration facilitates reactor refueling operations and reduces costs.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed:

1. A liquid metal reactor power block comprising:
    at least two nuclear islands, each of said islands comprising a liquid metal reactor system enclosed within a reactor vessel, and a containment structure, said containment structure comprising a containment vessel enclosing said reactor vessel, and a chamber enclosing a primary pressure relief volume;
    a liquid metal service facility comprising a liquid metal drain tank coupled to said reactor system, a liquid metal cooling system coupled to said reactor system, and a storage vault enclosing a common pressure relief volume, said storage vault coupled to said containment structure of each of said nuclear islands;
    a pressure relief system configured to connect said primary pressure relief volume and said common pressure relief volume, said pressure relief system comprising at least one rupture disc between said storage vault and said containment structure of each of said nuclear islands;
    a seismic isolation platform supporting said nuclear islands and said liquid metal service facility;
    a plurality of seismic isolation bearings configured to support said seismic isolation platform; and
    a support structure comprising:
        a floor configured to support said isolation bearings at about grade level; and
        a well portion coupled to said floor, said well portion configured to extend below grade level, said containment vessel configured to extend into said well portion.

2. The liquid metal reactor power block in accordance with claim 1 further comprising a containment vessel cooling system, said cooling system comprising:
    a collector cylinder within said well portion, said collector cylinder configured to surround said containment vessel;
    at least one plenum having a lower level and an upper level, said plenum lower level configured to direct an air flow toward said collector cylinder, said plenum upper level configured to direct the air flow away from said collector cylinder; and
    a stack comprising an outer duct configured to direct the air flow through said plenum lower level, and a center duct configured to vent the air flow from said plenum upper level.

3. A liquid metal reactor power block comprising:
    at least one nuclear island, each said nuclear island comprising a containment structure enclosing a primary pressure relief volume;
    a liquid metal service facility comprising a storage vault enclosing a pressure relief volume, said storage vault coupled to said containment structure;
    a pressure relief system configured to connect each said reactor island primary pressure relief volume and said storage vault pressure relief volume; and
    a seismic isolation platform supporting said nuclear island and said liquid metal service facility.

4. The liquid metal reactor power block in accordance with claim 3 wherein said pressure relief system comprises at least one rupture disc between said containment structure and said storage vault.

5. The liquid metal reactor power block in accordance with claim 3 comprising a plurality of nuclear islands wherein said service facility storage vault is coupled to said containment structure of each said nuclear island.

6. The liquid metal reactor power block in accordance with claim 3 wherein said at least one nuclear island comprises a plurality of identical nuclear islands configured in a symmetric arrangement on said seismic isolation platform.

7. The liquid metal reactor power block in accordance with claim 6 wherein said symmetric arrangement comprises said liquid metal service facility configured to be about equidistant from each said nuclear island.

8. The liquid metal reactor power block further in accordance with claim 3 further comprising a plurality of seismic isolation bearings configured to support said seismic isolation platform.

9. The liquid metal reactor power block in accordance with claim 8 further comprising a support structure, said support structure comprising:
    a floor configured to support said isolation bearings at about grade level;
    a well portion coupled to said floor, said well portion configured to extend below grade level.

10. The liquid metal reactor power block in accordance with claim 9 wherein said nuclear island further comprises a reactor system and a reactor vessel configured to enclose said reactor system, and wherein said containment structure comprises a containment vessel configured to enclose said reactor vessel, said containment vessel configured to extend into said well portion, and a chamber configured to enclose said first pressure relief volume.

11. The liquid metal reactor power block in accordance with claim 10 wherein said nuclear island further comprises a steam generator coupled to said reactor system, and a steam separator tank coupled to said steam generator.

12. The liquid metal reactor power block in accordance with claim 10 wherein said reactor system comprises a liquid metal reactor system.

13. The liquid metal reactor power block in accordance with claim 10 wherein said liquid metal service facility further comprises:
- a liquid metal drain tank coupled to said reactor system; and
- a liquid metal cooling system coupled to said reactor system.

14. The liquid metal reactor power block in accordance with claim 10 wherein said reactor system comprises a liquid sodium reactor system.

15. The liquid metal reactor power block in accordance with claim 10 wherein each said nuclear island further comprises a containment vessel cooling system.

16. The liquid metal reactor power block in accordance with claim 15 wherein said containment vessel cooling system comprises:
- a collector cylinder within said well portion, said collector cylinder configured to surround said containment vessel;
- at least one plenum having a lower level and an upper level, said plenum lower level configured to direct an air flow toward said collector cylinder, said plenum upper level configured to direct the air flow away from said collector cylinder; and
- a stack comprising an outer duct configured to direct the air flow through said plenum lower level, and a center duct configured to vent the air flow from said plenum upper level.

* * * * *